July 21, 1936.    O. JACOBSEN    2,048,384
LUBRICATED PLUG VALVE
Filed Dec. 27, 1935    2 Sheets-Sheet 1

INVENTOR.
OYSTEIN JACOBSEN
ATTORNEY

July 21, 1936. O. JACOBSEN 2,048,384
LUBRICATED PLUG VALVE
Filed Dec. 27, 1935 2 Sheets-Sheet 2
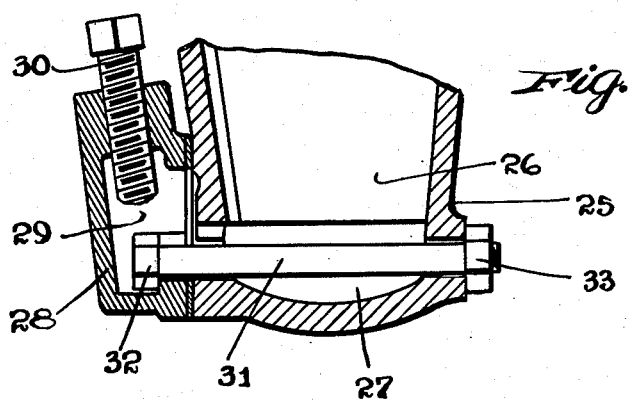
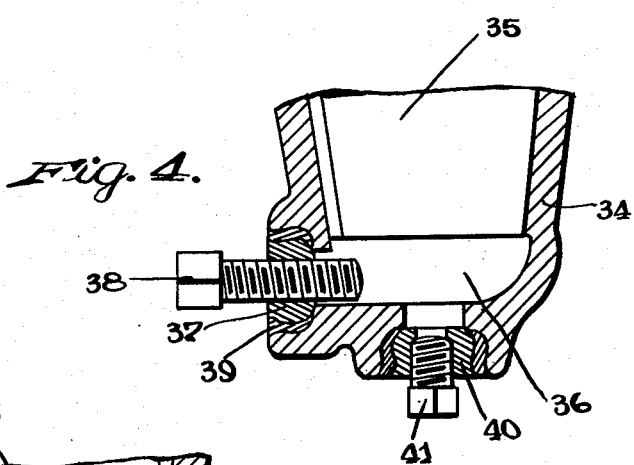
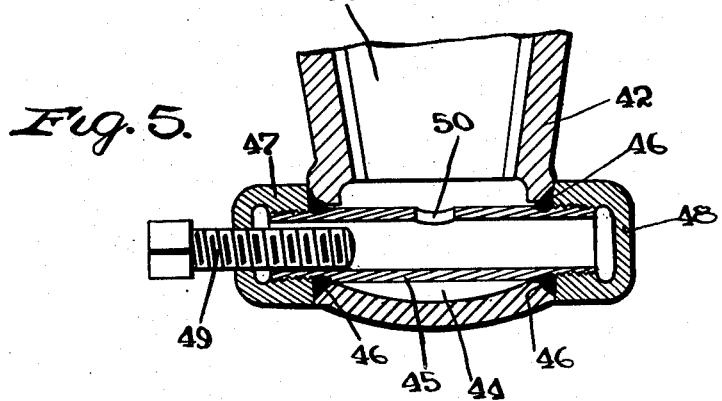
INVENTOR.
OYSTEIN JACOBSEN
BY James C. Bradley
ATTORNEY Patented July 21, 1936

2,048,384

UNITED STATES PATENT OFFICE 2,048,384

LUBRICATED PLUG VALVE

Oystein Jacobsen, Dayton, Ohio, assignor to The Duriron Company, Inc., a corporation of New York Application December 27, 1935, Serial No. 56,328

4 Claims. (Cl. 251—93)

Figure 1:
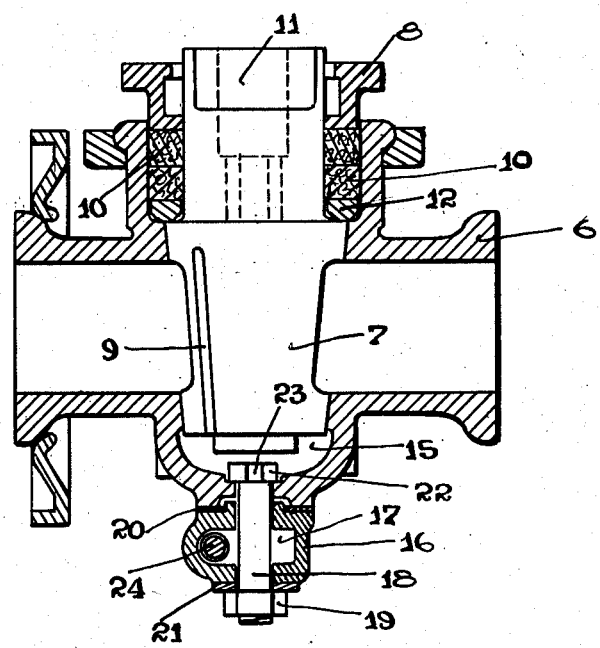
Figure 2:
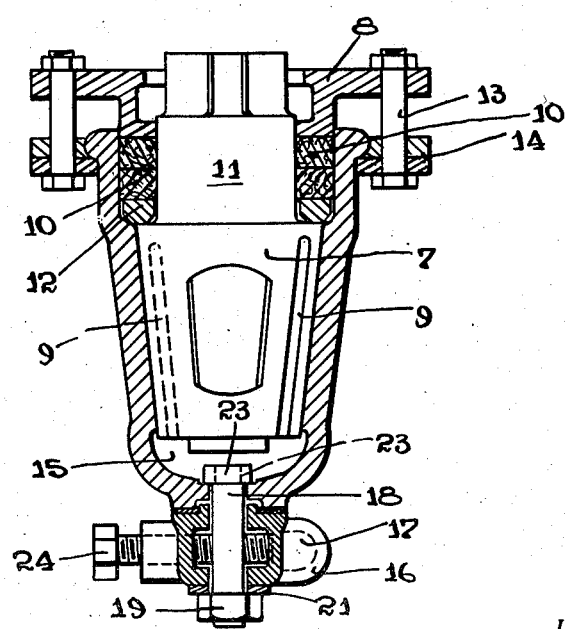

The invention relates to lubricated cocks or valves and involves an improvement over the valve of my Patent No. 1,440,083, dated December 26, 1922. It has for its principal objects the provision of a valve of the type specified, having improved means for lubricating the plug and lifting it with respect to its seat in case it should become stuck; which is simple and cheap; and which is particularly adapted to be made of corrosion resisting material, the parts which contact with the liquid and which are difficult or impossible of machining being so constructed as to avoid a requirement for machine work. Certain embodiments of the invention are shown in the accompanying drawings, wherein:

Figures 1 and 2 are sections through one form of valve, such sections being taken at right angles to each other. And Figs. 3, 4 and 5 are sectional views illustrating modifications.

Referring to the drawings, 6 is the valve casing, 7 is the plug or cock, and 8 is the follower of a stuffing box, these parts being preferably of corrosion resisting composition, although this is not necessarily the case, as the valve may be used in locations which do not require a composition of this character.

The plug is tapered as shown, and lubricating grooves 9 are provided at the surface of the plug. Suitable packing 10 is employed around the stem or shank 11 of the plug, such packing lying above the wear ring 12, which is also preferably of corrosion resisting material. The follower is held in position by means of the bolts 13, extending through the flange of the follower and the ring 14. The upper end of the plug shank is formed so as to permit the application of a suitable handle or wrench.

Located beneath the plug is a lubricant chamber 15 with which the grooves 9 communicate at their lower ends. An opening is provided in the bottom wall of the chamber and in opposition to this bottom wall is a member 16 having a cavity 17 for lubricant and a top wall which has an opening registering with the opening in the bottom wall of the chamber 15. A bolt 18 extends through the two openings and through an opening in the bottom wall of the member 16, such bolt carrying a clamping nut 19. Suitable gaskets 20 and 21 serve to seal the joints between the member 16 and the valve casing and between the nut and the bottom wall of the member. The bolt is provided with a round head 22, and the shank of the bolt beneath such head has a substantial amount of clearance in the openings through which it passes, in order to provide a passageway for lubricant between the cavity 17 and chamber 15. The head of the bolt is provided with a pair of grooves 23 to permit a flow of lubricant therethrough.

Pressure is applied to the lubricant in the cavity 17 by means of the screw 24 which is threaded through the side wall of the member 16 transversely of the center line of the plug. The plug is lubricated by turning the screw 24 at suitable intervals, which action applies pressure to the lubricant in the cavity 17 and chamber 15, causing the lubricant to move upward through the grooves 9. If the plug becomes stuck, it may be loosened by turning the screw 24 until the plug is moved upward from its seat.

The member 16, bolt 18 and screw 24, which do not contact with the liquid handled by the valve, may be made of ordinary valve composition, which is not corrosion resisting and which may be machined without difficulty. The construction is cheap and serviceable, the release means is positive in character, and the valve is particularly adaptable for fabrication from corrosion resisting material because of the avoidance of machine work on the parts which are made of the corrosion resisting composition.

Fig. 3 illustrates a modification, in which 25 is the valve casing, 26 the valve plug and 27 the lubricant chamber. Secured to one side of the casing is the member 28 having a cavity 29 and a screw 30 corresponding in function to the screw 24 of the Fig. 1 construction. The member 28 is clamped in sealing relation with the valve casing by means of the bolt 31, whose shank next the head 32 fits in a slot in the flange of the member 28. Clearance is provided along the shank of the bolt to provide a passageway for lubricant from the cavity 29 to the chamber 27. The other end of the bolt passes through the wall of the valve casing and is provided with a nut 33. In this construction, as in that of Fig. 1, the main valve parts may be of corrosion resisting material and the parts 28, 30 and 31 of ordinary machinable metal.

Fig. 4 illustrates a further modification in which 34 is the valve casing, 35 is the plug and 36 the lubricant chamber beneath the valve plug. The plug 37 acts as a closure for the chamber, and through it is threaded the screw 38 for applying pressure to the lubricant chamber. The plug is made of machinable metal, and is held in position by a soft metal packing 39 lying in the space between the periphery of the plug and the walls of the recess in which the plug is seated. As before, the valve casing and plug may be of corrosion resisting composition. The wall of the chamber may also be provided, in this case, with a second plug 40 seated in the same way as the plug 37 and provided with a closure screw 41. This permits of a mechanical loosening of the valve plug by a hammer tool in case of sticking.

Fig. 5 illustrates a modification, in which 42 is the valve casing, 43 the valve plug and 44 the lubricant chamber, these parts being of corrosion resisting composition. The side walls of the chamber 44 are perforated and through these openings extends a tube 45, which is threaded at its ends and welded to the casing, as indicated at 46. A pair of screw caps 47 and 48 close the ends of the tube, a pressure screw 49 being threaded through the cap 47. A perforation 50 gives communication between the interior of the tube, to which the pressure is applied by the screw and the chamber 44. In this case the parts 45, 47, 48 and 49 may be of ordinary, readily machinable, valve metal.

What I claim is:

1. In combination in a plug cock, a casing open at both ends having a tapering seat and a chamber or recess for lubricant below the seat, a tapering plug, a closure member for said chamber provided with a cavity for lubricant, means for clamping said member to the casing in sealing relation therewith and with said cavity in communication with the chamber, comprising a headed bolt extending through the member and casing with its head in releasable interlocking engagement with one of such parts, and a nut threaded on the shank of the bolt outside the member, and a screw threaded through the wall of said member and adapted to apply pressure to the lubricant in the chamber when it is screwed inward.

2. In combination in a plug cock, a casing open at both ends having a tapering seat and a chamber or recess for lubricant below the seat, a tapering plug, a closure member for said chamber provided with a cavity for lubricant, means for clamping said member to the casing in sealing relation therewith and with said cavity in communication with the chamber, comprising a headed bolt extending through the member and casing with its head in releasable interlocking engagement with one of such parts, and a nut threaded on the shank of the bolt outside the member, said bolt having clearance around its shank where it passes through the adjacent wall of the member and the casing to provide a communication between the cavity in the member and the chamber in the casing, and a screw threaded through the wall of said member and adapted to apply pressure to the lubricant in the chamber when it is screwed inward.

3. In combination in a plug cock, a casing open at its upper end having a tapering seat and a chamber or recess for lubricant below the seat with an opening through its bottom wall axial of the seat, a tapering plug, a closure member having a cavity for lubricant fitting over said opening and having an opening through its upper wall registering therewith, a headed bolt extending through said openings with its head in said chamber and with its shank extending through said cavity to the outside of the member, a nut on the shank of the bolt for clamping the member in sealing relation with the casing, and a screw threaded through the wall of said member and adapted to apply pressure to the lubricant in the cavity when it is screwed inward, a communication for a flow of lubricant being provided along the shank of the bolt from the cavity to said chamber.

4. In combination in a plug cock, a casing open at its upper end having a tapering seat and a chamber or recess for lubricant below the seat with an opening through its bottom wall axial of the seat, a tapering plug, a closure member having a cavity for lubricant fitting over said opening and having an opening through its upper wall registering therewith, a headed bolt extending through said openings with its head in said chamber and with its shank extending through said cavity to the outside of the member, a nut on the shank of the bolt for clamping the member in sealing relation with the casing, and a screw threaded through the wall of said member transversely of the center line of the plug and adapted to apply pressure to the lubricant in the cavity when it is screwed inward, a communication for a flow of lubricant being provided along the shank of the bolt from the cavity to said chamber.

O. JACOBSEN.